April 9, 1929.  A. H. C. TREPTE  1,708,641
MITER HACK SAW AND VISE
Filed July 11, 1927  2 Sheets-Sheet 1
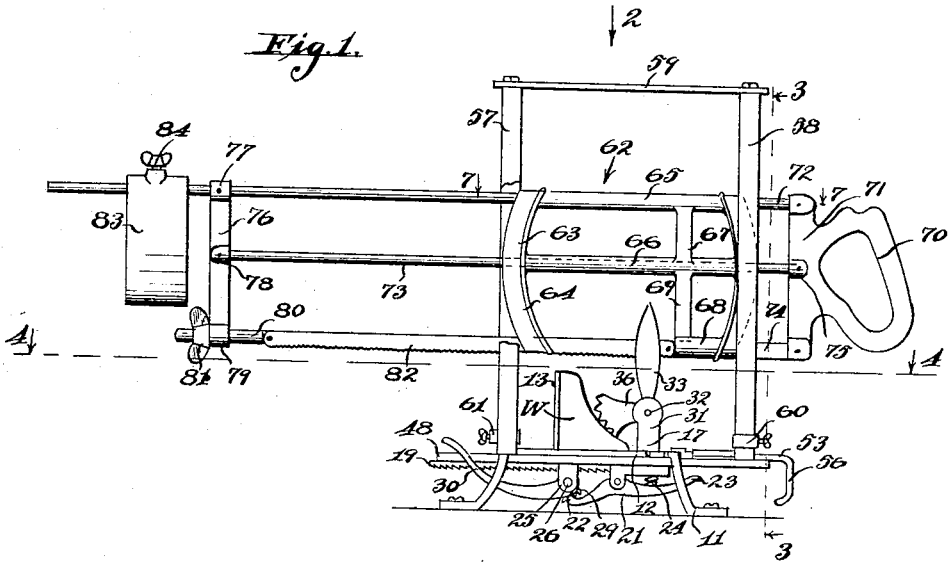
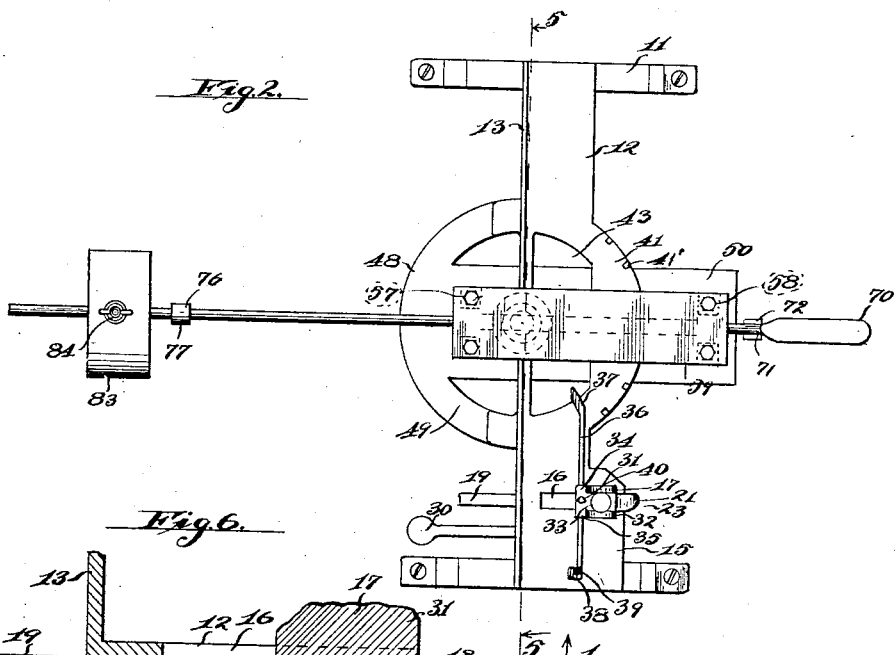
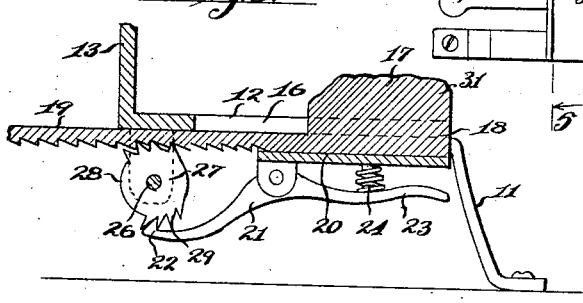
Inventor
A. H. C. Trepte April 9, 1929.  A. H. C. TREPTE  1,708,641
MITER HACK SAW AND VISE
Filed July 11, 1927  2 Sheets-Sheet 2
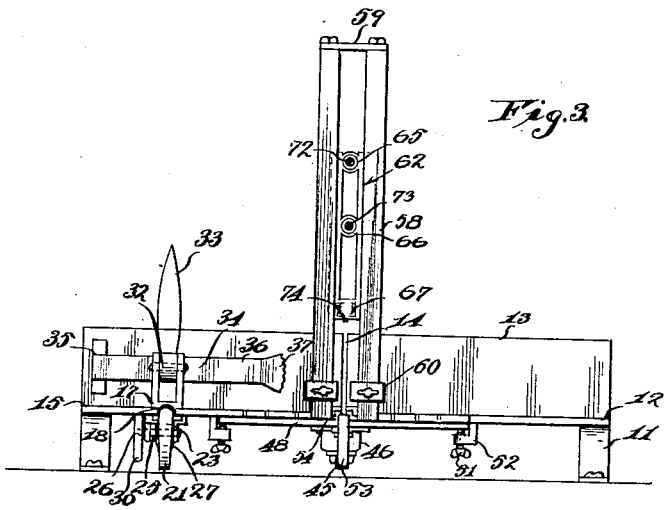
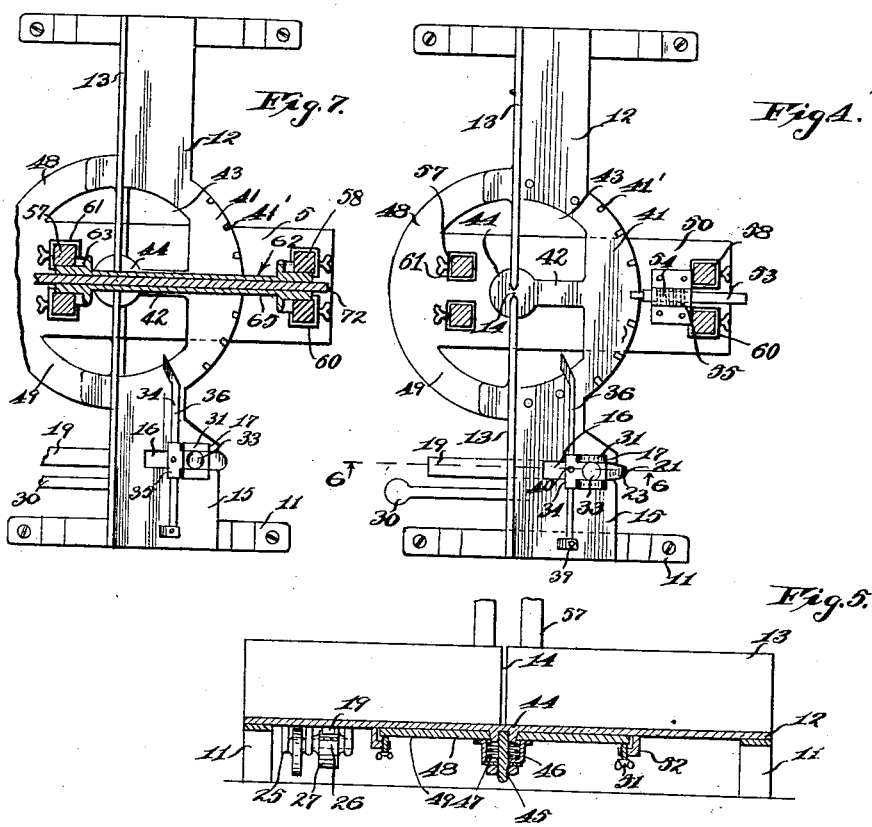

Patented Apr. 9, 1929.

1,708,641

UNITED STATES PATENT OFFICE.

ALFRED H. C. TREPTE, OF LOS ANGELES, CALIFORNIA.

MITER HACK SAW AND VISE.

Application filed July 11, 1927. Serial No. 204,799.

My invention is a miter hack saw and vise.

The main object of my invention is the hack saw guiding frame sliding between two sets of square posts, spaced apart. The saw guiding frame has curved stop flanges at each end to allow rocking of the saw guide frame and is provided with one tube at the top and one tube near the center of the saw guiding frame, and short square tubings at each end at the bottom to allow saw connecting ends to slide in. The hack saw frame slides inside of the tubing of the saw guiding frame at the top and near the center, and the saw connecting ends in the square tubing at the bottom of the guide frame.

An object of my invention is the construction of a fixed vise in which work may be secured, and having a rotatable table mounted thereon to support a hack saw. This table is provided with suitable angular stops to position the table in the proper relation to the vise so as to give the desired miter cut.

A further object of my invention is the particular manner of operating the vise, in which a rack governs the movement of a slidable jaw and this rack is controlled by a ratchet having a handle for manual manipulation. In connection with this there is another handle lever for actuating the jaws.

The rotatable table is supported on the bridging structure of the vise and carries a number of posts in which the hack saw is mounted to slide in the guide-way tubes. Therefore, when the table is turned in different directions the posts are also rotated and center the saw in proper relation to the work.

My invention is illustrated in the accompanying drawings, in which:

Figure 1 is a side elevation of my combined hack saw and vise taken in the direction of the arrow 1 of Fig. 2.

Figure 2 is a plan view taken in the direction of arrow 2 of Fig. 1.

Figure 3 is a vertical transverse section on the line 3—3 of Fig. 1 in the direction of the arrows.

Figure 4 is a horizontal section on the line 4—4 of Fig. 1 in the direction of the arrows.

Figure 5 is a vertical transverse section on the line 5—5 of Fig. 2 in the direction of the arrows.

Figure 6 is a detail longitudinal section on the line 6—6 of Fig. 4 in the direction of the arrows.

Figure 7 is a detail horizontal section on the line 7—7 of Fig. 1, in the direction of the arrows.

The vise and the mounting therefor is constructed substantially as follows:

A pair of legs 11 form the supports for a work table plate 12 which extends from side to side and has an up-turned flange 13. This flange has a central slot 14 to accommodate the hack saw blade, as hereunder described. At one end there is a widened portion 15 of the plate or work table with a longitudinal slot 16 therein.

The vise construction comprises a carrier 17 for a dovetail engagement 18 at the slot 16, and projecting forwardly underneath the work table is a rack 19. This rack slides in a groove 20. Below the work table there is a dog 21 having a tooth 22 and a handle 23 spring pressed outwardly by the compression spring 24. Depending also from the work table there are a pair of ears 25 in which is mounted a ratchet shaft 26 having a ratchet 27 with teeth to engage the teeth 19 of the rack, and having a smooth section 28. There are also teeth 29 on the ratchet to engage with the tooth 22 of the dog. The ratchet shaft 26 is operated by a handle 30 connected to the shaft 26.

A pair of ears 31 extend upwardly from the carrier 17. Pivotally mounted between these ears is a rock shaft 32 having a handle 33 connected thereto, and extending towards the work table is a lug 34 with a slide passage 35 therethrough.

A jaw holding bar 36 is slidable in the passage 34 and has a fixed jaw 37 at one end and a slidable jaw 38 mounted on the bar 36 at the other end. This latter jaw may be secured in different positions by means of a set screw 39 and a bar may be held in adjusted positions by means of a set screw 40 through the lug 34. It will be noted, referring to Fig. 1, that the jaws are formed with teeth arranged in a segment so that by tilting the handle the lug 34 may be tilted, and hence the jaws brought into engagement with the curved surface of the work W as illustrated. The back surface of the jaw 37 is beveled to allow placing of this close to the slot 14.

The saw and its adjustment is substantially as follows:

The work table 12 has an arcuate lateral extension 41 which has adjusting notches 41′ therein. There is also a forwardly extending tongue 42 across an open section 43. A hub 44 is formed centrally of the slot 14 and secured to this hub there is a bolt or screw 45 which extends downwardly. A cup 46 is secured on the bolt and retains a compression spring 47 which presses upwardly against the saw frame base 48.

This base has an arcuate section 49 and a central platen 50 which is in the same plane as the saw frame base 48. The edges of this base are engaged by set screws 51 which are threaded in brackets 52 depending from the under surface of the work table 12. A trigger 53 is slidably mounted in a guide 54 which has a spring 55 therein, the spring tending to force the trigger into the notches 42. The trigger may be protracted by a handle 56.

There are a pair of front and back standards or posts 57 and 58 which are spaced apart and fastened in a secure manner to the platen 50 of the base and form the structure for guiding the saw, as hereunder set forth. These standards are connected by a capping plate 59 and on the standards there are adjusting collars 60 and 61 having set screws to adjust the depth of cut of the saw.

The saw guide frame 62 has a pair of arcuate guides 63 with flanges 64. The guides fit between the standards as illustrated in Fig. 7, the flanges being adapted to engage the inner faces of the standards 57 and 58 (see Fig. 7). Connecting the guides 63 at the top there is a tube 65 and at the mid position there is another tube 66. These are braced by a vertical brace 67. A square tube 68 is connected to the lower end of one of the guides and at its outer end is attached to a brace 69, thus the guide frame is an integral unit and may be inserted in the guide standards 57 and 58 by removing the capping plate 59.

The saw comprises a handle 70 having a vertical end 71 preferably formed integral therewith and a rod 72 is secured to the upper part thereof. A central rod 73 is secured to the middle part and a squared bar 74 to the lower part. These have a rigid connection to the handle by being fitted in sockets in lugs 75. At the outer end of the saw there is a bar 76 having a lug 77 at the top with an opening therethrough so that the bar 72 may extend therethrough. The bar 73 is rigidly secured in a socket in the lug 78. The lug 79 has a bore therethrough and in this is fitted the tension bolt 80 actuated by a thumb nut 81 threaded thereon. This tension bar has a pin to engage in the saw blade 82, the other end of the blade being secured to the free end of the bar 74. If desired a weight 83 is secured on the end of the bar 72 by means of a set screw 84.

The manner of using and functioning of my miter hack saw and vise is substantially as follows:

In order to clamp work by the vise on the end of the work table 12, a piece of work W may be positioned on this table and abutted against the flange 13 and extending across the notch 14 at the proper position to make the cut. Then the carrier 17 is shoved towards the work, with the handle 30 having first been positioned so that the smooth part 28 of the ratchet 27 slides over the teeth on the rack. By operating the handle 30 the teeth of the ratchet may then be brought into engagement with the teeth of the rack, thus pulling the follower 17 into close contact with the work. It will be noted that on account of the arcuate shape of the jaws 37 and 38, these may readily engage work which presents a concave surface to said jaws, as shown in Fig. 1 and they may be rocked into different positions to engage work most advantageously.

As above mentioned, the saw guide frame 62 with the saw fitted therein may be inserted in the standards 57 and 58 by removing the cap plate 59. The standards may be adjusted so that the saw will cut at the proper angle relative to the work, by engaging the trigger 53 in the desired notch 42. Thus the desired bevel or miter may be cut on the work in hand. If it is desired to make a cut which is between two of the notches, the frame base 48 may be adjusted and held in position by tightening the set screws 51 which are secured in brackets 52 from the under surface of the work table 12. The weight 83 on the saw causes this to press downwardly on the work being cut without effort on the part of the person operating the saw. In order to limit the downward movement of the saw in the work if desired the adjusting collars 60 and 61 may be located in different positions on the saw stand. It is to be understood that if desired, the work table 12 may be provided with a vise construction upon each end thereof, and that either or both of the vises on opposite sides of the saw may be utilized, depending upon the nature of the work W to be held thereby.

Various changes may be made in the principles of my invention without departing from the spirit thereof, as set forth in the description, drawings and claims.

I claim:

1. In the art described the combination of a flat work table, a frame base pivotally connected to said table to rotate thereon, means to adjust the angularity of the frame base relative to the work table, a pair of standards extending upwardly from the frame base, each having a pair of posts, a saw guide frame slidable between each of the pair of posts, said guide frames having flanges on each end formed arcuate to allow rocking of the guide frame, and a saw slidable in the guide frame.

2. In the art described the combination of a work table having a frame base pivotally connected thereto by a vertical pivot, means to adjust the relative angle of the base and the work table, a pair of standards extending upwardly from the frame base, each having a pair of posts, a saw guide frame having a pair of guides with arcuate flanges slidable between the posts, each of the flanges being connected by an upper tube and a center tube, a saw having a number of rods slidable in said tubes, and a saw blade extending below the arcuate guides.

3. In the art described as claimed in claim 2, one of the arcuate guides having a third tube connected thereto, the saw having a bar slidable therein, and one end of the saw blade being connected to said bar.

4. In a miter saw, an adjustable structure having a pair of standards each with a pair of posts spaced apart, a guide frame slidable vertically in the posts, said guide frame having guides with arcuate flanges and upper and lower tubes connecting said flanges, a bottom tube connected to one of the guides, a saw having longitudinal rods slidable in the upper and lower tubes and a bar slidable in the bottom tube, and a saw blade connected to the said bar.

5. In a hack saw construction, a supporting structure having a pair of standards with a space between each pair, a guide frame mounted therein, said frame having arcuate guides to bear against the adjacent faces of the said pair of standards and having a connecting structure between said guides, said connecting structures being adapted to support and to guide the saw, the said arcuate guides allowing tilting of the saw in reference to the said standards.

6. In a hack saw construction, a supporting structure having a pair of posts forming standards, each of the posts having a space therebetween, a guide frame having a pair of arcuate guides, each guide having laterally extending flanges to engage the adjacent faces of the pair of posts and having guide structures fitting in the spaces between each pair of posts, the said guides being connected by tubular members, said tubular members being adapted to support and guide rods of a saw, the arcuate guides allowing tilting of the saw at an inclination in reference to the standards.

7. In a hack saw construction, a supporting base swivelling on a vertical pivot and having a pair of post structures forming standards extending upwardly therefrom, each of the post structures having a vertical space, a guide frame having a pair of arcuate guides with flanges engaging the adjacent faces of the pair of posts and having part of the arcuate guides fitting in the space between a pair of posts, tubes connecting the arcuate guides at the top and in the middle and having braces connecting the said tubes, a saw having a handle at one end, a bar at the other and connecting rods between the handle and the bar, a pair of said rods sliding in said tubes, said arcuate guides allowing tilting of the saw in reference to the supporting base.

In testimony whereof I have signed my name to this specification.

ALFRED H. C. TREPTE.